Aug. 12, 1969   D. B. KOEPKE   3,460,840
AUTOMATIC RECORD CHANGER

Filed Aug. 11, 1966   5 Sheets-Sheet 1

INVENTOR.
DONALD B. KOEPKE
BY
Harbaugh & Thomas
Attys

Aug. 12, 1969     D. B. KOEPKE     3,460,840
AUTOMATIC RECORD CHANGER

Filed Aug. 11, 1966     5 Sheets-Sheet 2

INVENTOR.
DONALD B. KOEPKE
BY
Hartaugh & Thomas
Attys

Aug. 12, 1969  D. B. KOEPKE  3,460,840
AUTOMATIC RECORD CHANGER

Filed Aug. 11, 1966  5 Sheets-Sheet 4

INVENTOR.
DONALD B. KOEPKE
BY
Harbaugh & Thomas
Attys

Aug. 12, 1969     D. B. KOEPKE     3,460,840
AUTOMATIC RECORD CHANGER
Filed Aug. 11, 1966     5 Sheets-Sheet 5

INVENTOR.
DONALD B. KOEPKE
BY
Harbaugh & Thomas
Attys

United States Patent Office 3,460,840
Patented Aug. 12, 1969

3,460,840
AUTOMATIC RECORD CHANGER
Donald Bernard Koepke, Franklin Park, Ill., assignor, by mesne assignments, to U.S. Industries, Inc., New York, N.Y., a corporation of Delaware
Filed Aug. 11, 1966, Ser. No. 571,846
Int. Cl. G11b 17/16
U.S. Cl. 274—10                    12 Claims

ABSTRACT OF THE DISCLOSURE

The disclosure describes a record changer characterized by its low silhouette, compact design, lightness of weight and simplicity of parts and functions, having means to play a sole or last record a desired number of times, a removable pick-up head, an adjustable tone arm counter balance, an automatic braking mechanism so that rotation of the records is stopped just before lift-off and held until just after set-down of the tone arm, means to indicate the record size, number of repeats and whether the machine is in manual or automatic play, means for locking the tone arm in "OFF" position when the last record is played, with or without the repeat mechanism activated, and means for manual reject, automatic reject and remote control reject of a record.

---

This invention is an improvement over the inventions disclosed in the following United States Patents:

| Patent No. | Inventor | Date |
| --- | --- | --- |
| 2,634,983 | C. B. Dale | Apr. 14, 1953. |
| 2,963,297 | E. S. Bara | Dec. 6, 1960. |
| 2,966,358 | J. Cleybergh | Dec. 27, 1960. |
| 2,974,962 | C. B. Dale | Mar. 14, 1961. |
| 2,818,263 | C. B. Dale | Dec. 31, 1957. |
| 3,023,009 | C. B. Dale | Feb. 27, 1962. |
| 3,033,576 | E. S. Bara | May 8, 1962. | the disclosures of which are incorporated herein by reference.

A primary object of this invention is to provide an automatic record changer of the character described wherein a series of novel constructions, combinations and arrangements of parts produces a simple, low cost, lightweight, low silhouette, highly efficient and practical sound record reproducing machine.

Another object of this invention is to provide an automatic manual record player and changer wherein an adjustable indicator having an over-riding dial mechanism is provided, which controls the repeat play of a sole or last record during manual operation or at the end of automatic play.

Another object of this invention is to provide a single means having a plurality of functions including the shut-off of the machine, control of the tone arm, delay in shut-off of the machine, control of the number of repeat plays and actuation of the tone arm latch.

Another object of this invention is to provide a bearing-mounted tone arm with a removable pick-up head and adjustable counter-balance thereon.

An object of this invention is to provide means to prevent accidental rejection of a record, avoid jack-potting or double repeats and last record shut-off delay means in combination with an indicator for the last play, to facilitate the operation and enjoyment of a record player.

An object of this invention is to provide in a record player a motor bearing carried by the housing to lower the silhouette of the mechanism and facilitate its operation.

A further object of this invention is to provide double friction drive means for the turntable in a record player, and automatic braking of the turntable at prescribed times.

An object of this invention is to provide a record player in which in normal operation, after the machine is turned on, the tone arm can be lifted off by hand to place the machine in automatic-manual operation and when the stack of records is completed, the machine initiates its own shut-off or can be operated so that the last record or a sole record will be played continuously a desired number of times.

These and other objects of this invention and the mechanisms for their accomplishment will become apparent or be described as the specification proceeds and it is to be understood that the invention resides in the novel constructions, combinations and arrangements of parts and their cooperation, one with another, in sequence or intermittently, the novel features of which are set forth in the appended claims. The invention, both as to its organization, mode of operation, together with its features and objects or additional objects and advantages will be more clearly understood from the following description of a specific and non-limiting embodiment when taken in connection with and illustrated by the accompanying drawings in which:

Figure 1:
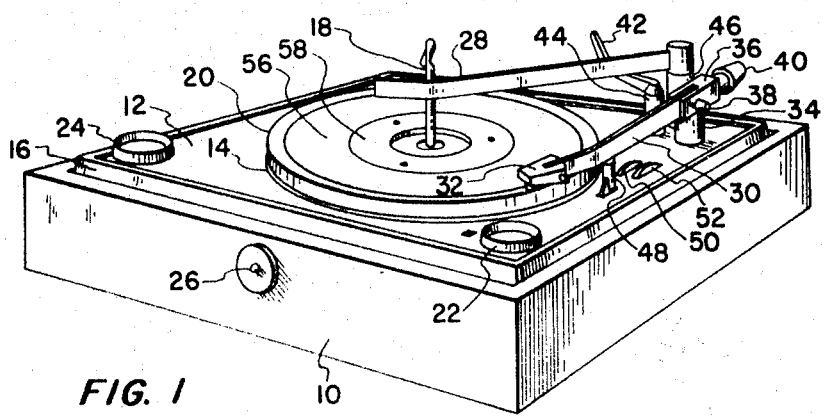
FIG. 1 is a perspective view of a record player incorporating this invention.

Referring now to the drawings and more particularly to FIG. 1, the record player or record changer is seen to permit a low silhouette and comprises a cabinet 10 of ordinary rectangular design which may be a hardwood cabinet or a thin-walled attache case receptacle for the record player. The cabinet 10 supports, on spring mountings (not shown) a platform 12, provided with a central well 14, which houses part of the mechanism, and a marginal bevelled flange 16 which fits within the top opening of cabinet 10.

A known form of upstanding spindle 18 carries the turntable 20 on a conventional bearing sleeve, reinforcing plate, bearing hub and the like supported in the well 14 through a central aperture in a manner disclosed in United States Patent 2,974,962. Since the invention does not reside in these parts, and other equivalent parts known in the art may be used, there is no necessity for further description. It suffices to state that the turntable 20 is rotatably mounted on the stationary spindle 18 in a conventional manner.

FIG. 1 also shows the "ON-OFF-REJECT" knob 22, the speed control knob 24, last record indicator light 26, the record hold down arm 28, the tone arm 30 with the pick-up head 32, carried by the support post 34 through the yoke 36, in which the tone arm set adjustment knob 38 and counter balance 40 operate. A flag or sensing device 42 is rotatably secured within the support post 44. Record holder 28 is carried within the support post 46 on a shaft having a transverse pin engageable in a slot at the top edge thereof, in a manner known in the art. In the embodiment shown in FIG. 1, the device is in "OFF" position with respect to the tone arm 30 at rest on the post 48, but the record holder 28 is set for automatic operation. Dial indicators for size of record 50 and repeat 52 are shown in finger operating position, extending through slots in platform 12.

Figure 2:
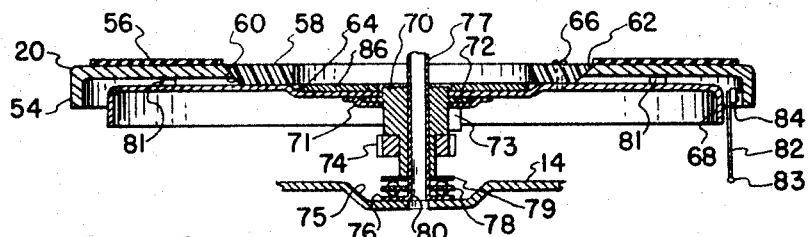
FIG. 2 is a cross-sectional view of the turntable of this invention.

In FIG. 2, the turntable 20 is shown to comprise a plate having down-turned circumferential flange 54, a friction mat 56 composed of soft composition, i.e., a rubber and plastic composition, to hold a record in non-sliding relationship, an inner plastic ring 58 with a beveled edge 60 positioned within a central aperture of turntable 20, the inner edge of which has a corresponding beveled edge 62 in close-tolerance spaced relationship therewith. Ring 58 is held to a second plate 64 by means of screws such as 66. The plate 64 is of slightly lesser diameter than plate 20, and has a down-turned circumferential flange 68. The plate 64 is carried by a bearing sleeve 70, attached thereto by means of plate or yoke 71 encompassing flange 72 which is welded or otherwise attached to the bottom of the plate 64. The bearing sleeve 70 has a dog or cog 73 extending from one side thereof and the lower portion carries gear 74. A pocket 75 in the well 14 provides space for the base 76 of spindle collar 77 upon which the sleeve 70 is rotatably supported by means of the thrust bearing 78 and thrust washer 79. The central aperture 80 accommodates the spindle 18 (not shown). A plurality of Neoprene washers 81 are attached to and circumferentially spaced around the underside of plate 20, serving as spacers and bearing surfaces so that the plate 20 is free to rotate on the plate 64, with a slight friction drag while being centered by the edges 60 and 62 of ring 58 and the plate 20. The ring 58 rotates with the plate 64 and is slightly depressed under the plane of the mat 56 so as to not engage the record; while the plate 20, which carries the records during play, may or may not rotate therewith, under the friction of washers 81 depending upon position of the brake arm 82, mounted on pin 83, and brake shoe 84 in relation to flange 68. The function of these parts will be subsequently described. An ornamental ring 86 of spun aluminum or the like can be provided on the top inner surface of the plate 64.

Figure 3:
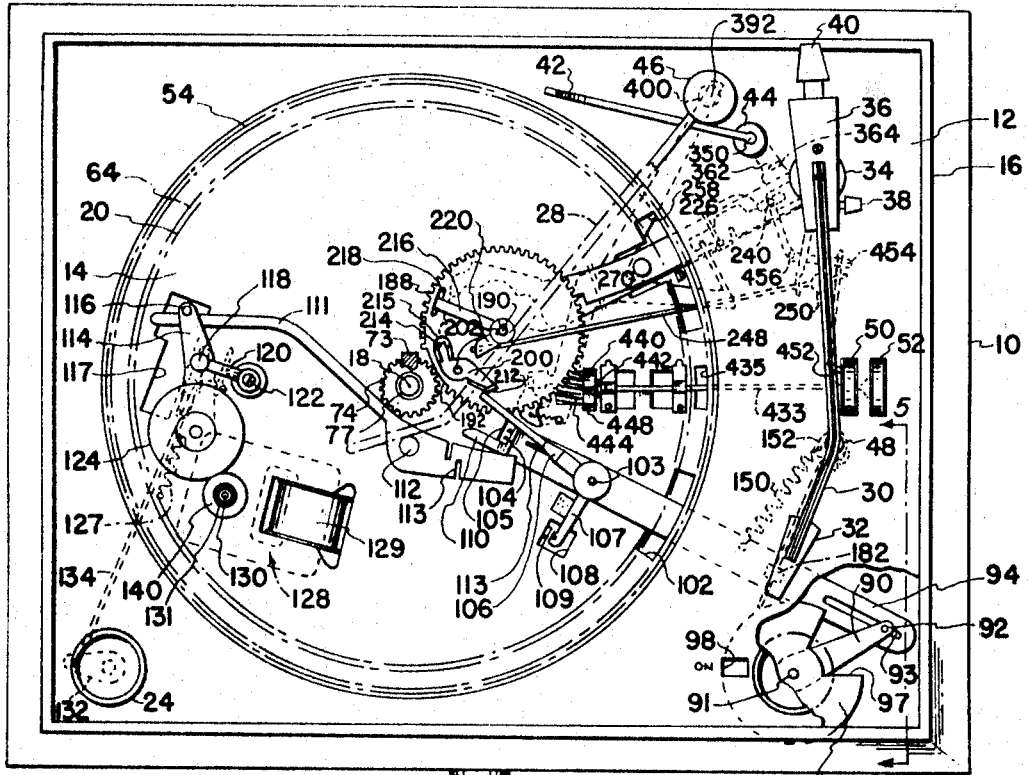
FIG. 3 is a top plan view of the record player with the turntable removed showing parts of the automatic control mechanism, the drive mechanism and the shut-off mechanism, partly in phantom.

Referring to FIG. 3, the "ON-OFF-REJECT" switch knob 22, shown in OFF position, is attached to the crank 90 by means of the shaft 91 extending to the underside of platform 12. The crank 90 carries the upright pin 92 which engages the slot 93 in the end of starting lever 94. This view is partially cut away to show the disc-like dial 96, with lost motion slot 97, also rotatably mounted on shaft 91 between platform 12 and crank 90. A window 98 is provided in platform 12 through which to register "manual" or "automatic" positions of switch 22 as more fully described in connection with FIGS. 5 and 6.

The lever 94 extends through opening 102 in the central well 14 and is pivotally mounted therein by means of pin 103. Pivoting of the lever 94 on the pin 103 causes one of two downwardly depending pins 104, which extend through the slot 105, to engage a lever operating the main toggle switch (not shown), located under the well 14. The lever 106 is also pivotally mounted on the pin 103, independent of the lever 94. This lever is L-shaped; and the arm 107 thereof has a downwardly depending ear extending through aperture 108 of well 14. An electromagnet 109 is located adjacent and in operative position with the arm 107 beneath well 14.

Figure 4:
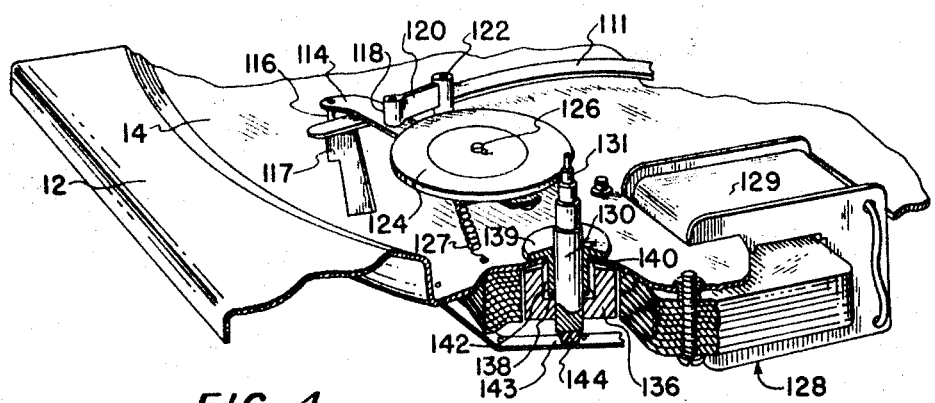
FIG. 4 is a perspective view in partial section showing the arrangement of the motor mount, bearing, speed changer and friction drive.

The starting lever 94 has an upwardly depending ear 110 adapted to pass under lever 106 and also to engage the end of the speed control lever 111 pivotally mounted on the pin 112 fastened to the bottom of the central well 14. The notches 113 are provided adjacent to lever-to-lever contact points to provide means to adjust the lever actions. The other end of the lever 111 passes under the arm 114 (see also FIG. 4) and engages the pin 116 depending therefrom. A portion of the well 14 is cut away at 117 to allow movement of the pin 116 and access to the parts. The arm 114, in turn is pivoted on pillar bearing 118, carried by and at the end of the intermediate lever 120, pivoted from the pillar bearing 122. The other end of the lever 111 carries the rubber idler wheel 124 on a third pillar bearing 126. The spring 127 attaches between the bottom of well 14 and the arm 114, biasing the pin 116 against lever 111. The drive motor 128 with motor coil 129 has the shaft 130 with four stepped positions 131, each of a different diameter; the smallest diameter adapted to drive the idler at 16 r.p.m. at 60 c.p.s., the second adapted to drive the idler at 33⅓ r.p.m. at 60 c.p.s., the third position adapted to drive the idler at 45 r.p.m. at 60 c.p.s., and the fourth position adapted to drive the idler at 78 r.p.m. at 60 c.p.s. as described in U.S. Patent 2,974,962.

The speed control knob 24 is attached to the crank 132 (FIG. 3) which is pivotally connected to the rod 134, connected in turn to a mechanism (not shown), under well 14, adapted to raise and lower the pillar bearings 118 and 122 along with the lever 120 and the idler 124 so that the later is engageable with the stepped positions 131 of the shaft 130. Movement of switch 22 to "ON" position trips the main toggle switch through pins 104 on the lever 94 and starts motor 128, at the same time the ear 110 moves away from lever 111 allowing the spring 127 to pivot the idler 124 into contact with the shaft 130 and simultaneously into contact with the inside surface of the flange 68 of the plate 64. This action causes the rotation of the turntable 20 through the rotation of the shaft 130 and armature 136 (FIG. 4) mounted in the bearing 138 and having a supporting collar 139. The bearing 138 fits tightly within aperture 140 of the well 14 and extends within recess 142 of the armature 136 to provide a low silhouette. An end thrust bracket 143 and the nylon button 144 provide a bearing mount. The shaft 130 is press-fitted into armature 136. By this construction, the shaft 130 may be fabricated in a much shorter length than previous embodiments and motor 128 mounted against well 114 or even set within an aperture therein for a lower silhouette.

Figure 5:
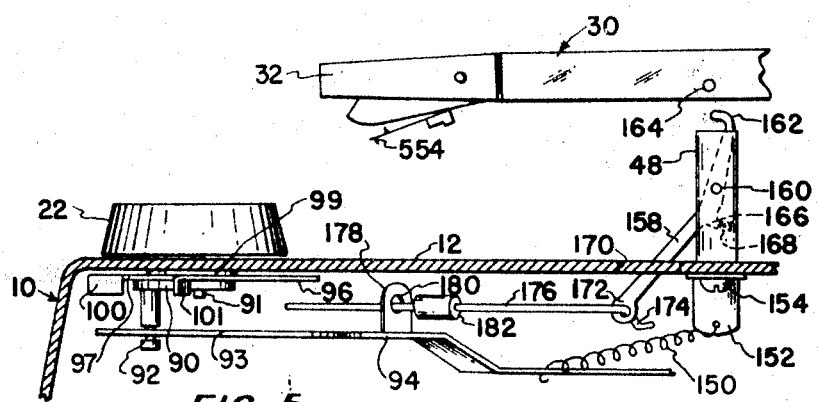
FIG. 5 is a fragmentary cross-sectional view taken along lines 5—5 in FIG. 3 to show the lock and release mechanism for the tone arm.
Figure 6:
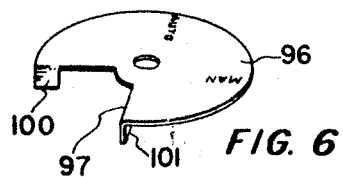
FIG. 6 is a perspective view of the indicator disc to show the "MANUAL" and "AUTOMATIC" positions of switch 22.

In FIG. 5 the relationship of friction washer 99 on the shaft 91 between the platform 12 and disc-dial 96 is shown. Also the position of the extended end of the crank 90 between downwardly depending ears 100 and 101 at the periphery of the lost motion slot 97 is made clear. As switch knob 22 is turned to "ON" position, the end of the crank 90 impinges against the ear 100 and carries the indicia "MAN" into registry with window 98. By turning the switch 22 to "REJ" position, dial 96 is carried further so that the indicia "AUTO" registers with the window 98. FIG. 6 is a detail of the disc 96.

The mechanism for locking the tone arm 30 in "OFF" position and automatically releasing the same in "ON" position is also shown in FIG. 5. As the crank 90 rotates, the pin 92 within slot 93 rotates the starting lever 94. The spring 150, strong enough to over-ride the spring 127 (FIG. 3), attaches between the lever 94 and the bracket 152 held in place by screw 154, which also engages and holds the post 48 in place on platform 12. The post 48 is slotted longitudinally to receive vertically disposed lever 158 pivotally held therein by the transverse pin 160. The lever 158 has a hook 162 at its upper end which is engageable with the transverse pin 164 in the longitudinally slotted body of arm 30. The lever 158 has a shoulder 166, off-set from the pin 160, engaging compression spring 168 carried within a depression in the slot of the post 48. The lower end of the lever 158 extends out of the slot of post 48, through an aperture 170 in platform 12 and has eyelet 172 engaging the offset 174 of the rod 176. The other end of the rod 176 is carried by the guide-stop 178, being slidably disposed within aperture 180 thereof. The nut 182 is attached to the rod 176 and is adapted to be fixed at any desired location thereon.

The knob 22 is shown in "ON" position in FIG. 5 wherein the crank 90 has turned slightly to move the starting lever 94 so that the stop 178 is moved away from the nut 182, against the tension of the spring 150. This allows the rod 176 to move therewith the limit of the movement of the lever 158 in post 48 under the pressure of the spring 168 and releases hook 162 from pin 164 to free the counter-balanced tone arm 30. When the tone arm is returned to its rest position on the post 48, and the knob 22 is rotated to "OFF" position, the lever 94 returns under the action of spring 150, the stop 178 hits nut 182, driving the rod 176 and the lever 158, against spring 168, into lock position with the hook 162 over pin 164.

A feature of this invention is the provision of the above-described improvements along with certain other improvements in a record player which is capable of either manual or automatic operation, without the requirement of additional or separate controls to accomplish any shift from one type of operation to the other. Furthermore, a change from automatic to manual operation can be made simply by moving the tone arm 30 from its rest position on post 48 into engagement with a record tablet on the turntable 20, or by returning the tone arm to the rest position on post 48 at any time during automatic operation of the record player. Also control of the record player remains manual until the record reject control knob 22 is returned to "REJ" position, which causes the automatic recycling sequence to be maintained until all of the records on the storage spindle 18 have been played or until the tone arm 30 is again manipulated to return the record player to manual control as before described. And as an added feature by adjustment of the dials shown in FIG. 10, a sole or last record can be played repeatedly ten times or more.

The mechanism for providing manual or automatic control of the record player is shown in FIGS. 3 et seq. same being a modification and improvement over that described in United States Patent 2,963,297 by E. S. Bara. However, certain parts of the record player as shown have been omitted or are only briefly described because they form no part of the instant invention. These include the mechanism for changing the elevation and consequent position of engagement of rubber idler (drive) wheel 124 with shaft 130 and the linkage between speed selector knob 24 and said speed change mechanism.

It will be noted from FIG. 2 that the turntable 20 and the bearing sleeve 70 with attached drive gear 74 are free to rotate upon bearing 78 and that with the spindle 18 in place within the sleeve 77, the gear 74 is engageable with the recycling gear 188 (FIG. 3) which is rotatably mounted on vertical shaft 190 supported from the well 14. The recycle gear has a recess 192 wherein the gear teeth are removed.

The rotation of the turntable 20, through the motor 128 and the idler wheel 124, rotates the drive gear 74 which engages the recycling gear 188 over substantially the entire circumference thereof, with the exception of the recess 192. During the playing of a record the recess 192 is opposite the drive gear 74 and the recycle mechanism is disengaged. A recycle actuator lever 200 is rotatably mounted on the pin 202, secured to the top and spaced inwardly from the periphery of the recycling gear 188. The recycle actuator lever 200 is positioned above the drive gear 74 in the same plane as the protuberance 73 and has a pair of vertical flanges (FIG. 8) 204 and 206 (FIGS. 7 and 8) on one end and a vertical L-shaped flange 210 at the other end with an angular off-set 212 (FIG. 3). Means to limit the pivotal movement of the actuator lever 200 are provided by means of downward depending ear 214 extending within the aperture 215 in the recycle gear 188.

The shaft 190 carries the stationary actuator return arm 216 above and spaced from the recycling gear 188. A transverse downwardly depending guide 218 is provided at the extended end of the stationary actuator return arm 216 and the other end carries an angularly disposed slotted tab 220.

It is thus seen that when the turntable 20 and the gear 74 are rotating (clock-wise) with the recess 190 in the position shown in FIG. 3, the recycling gear 188 is not engaged by the gear 74. When the recycle actuator lever 200 is pivoted counter-clock-wise within the limits of movement ear 214 within aperture 215, the edge of the flange 204 is brought into engagement with the protuberance 73 and the recycle gear is rotated counter-clock-wise a short distance, sufficient to bring the gear teeth of the recycle gear into engagement with the gear 74. This causes the recycle gear 188 to rotate one revolution and carries the outside surface of the flange 204 into sliding engagement with the inside surface of transverse guide 218. By these means the actuator lever 200 is pivoted clock-wise, and as the gear 74 disengages into the recess 190, the recycle actuator lever 200 and the recycle gear 188 stop in the position shown in FIG. 3. On the next revolution of the protuberance 73, it again clears the flange 204 as the turntable 20 continues to rotate.

The recycle actuator lever 200 is unbiased and free to rotate within the limits of the movement of ear 214 within aperture 215. The actuator return arm 216 is accordingly located at a point along the circumferential path of the recycle gear 188 which is close to the gear 74. This eliminates the possibility of accidental movement of the actuator lever counter-clock-wise into engagement with the protuberance 73 after the transverse guide has moved it out of such a position of engagement. Full pivotal movement of the actuator lever 200 is assured by the flange 210 which is likewise engageable with the transverse guide 218 to pivot the actuator lever clockwise to its fullest extent before movement counter-clock-wise by impingement with the side of flange 204. Accordingly, the actuator lever cannot assume an intermediate position and inactivate the recycle mechanism.

The pivotal movement of the recycle actuator lever 200 into engagement with the protuberance 73 is accomplished by: (a) the upstanding ear 110 of the starting lever 94, which engages the L-shaped flange 210 upon being pivoted into engagement therewith by rotation of knob 22, (b) the activation of solenoid 109, by means yet to be described, which pivots the lever 106 against the flange 210, and (c) by means of the movement of the tone arm 30 as it comes to the velocity or lead-in grooves at the end of a record during automatic operation. Any one of these functions causes the rotation of the recycling gear and results in a complete recycling operation of the record player, during which the tone arm 30 is swung into the position shown in FIG. 1 or 5, a record is dropped onto the turntable 20 and the tone arm is moved into alignment with the periphery of the record tablet and lowered into engagement with the grooves thereof. The elements and their combinations, as modified in accordance with this invention to accomplish these results in more facile and novel manner, will now be described.

Figure 7:
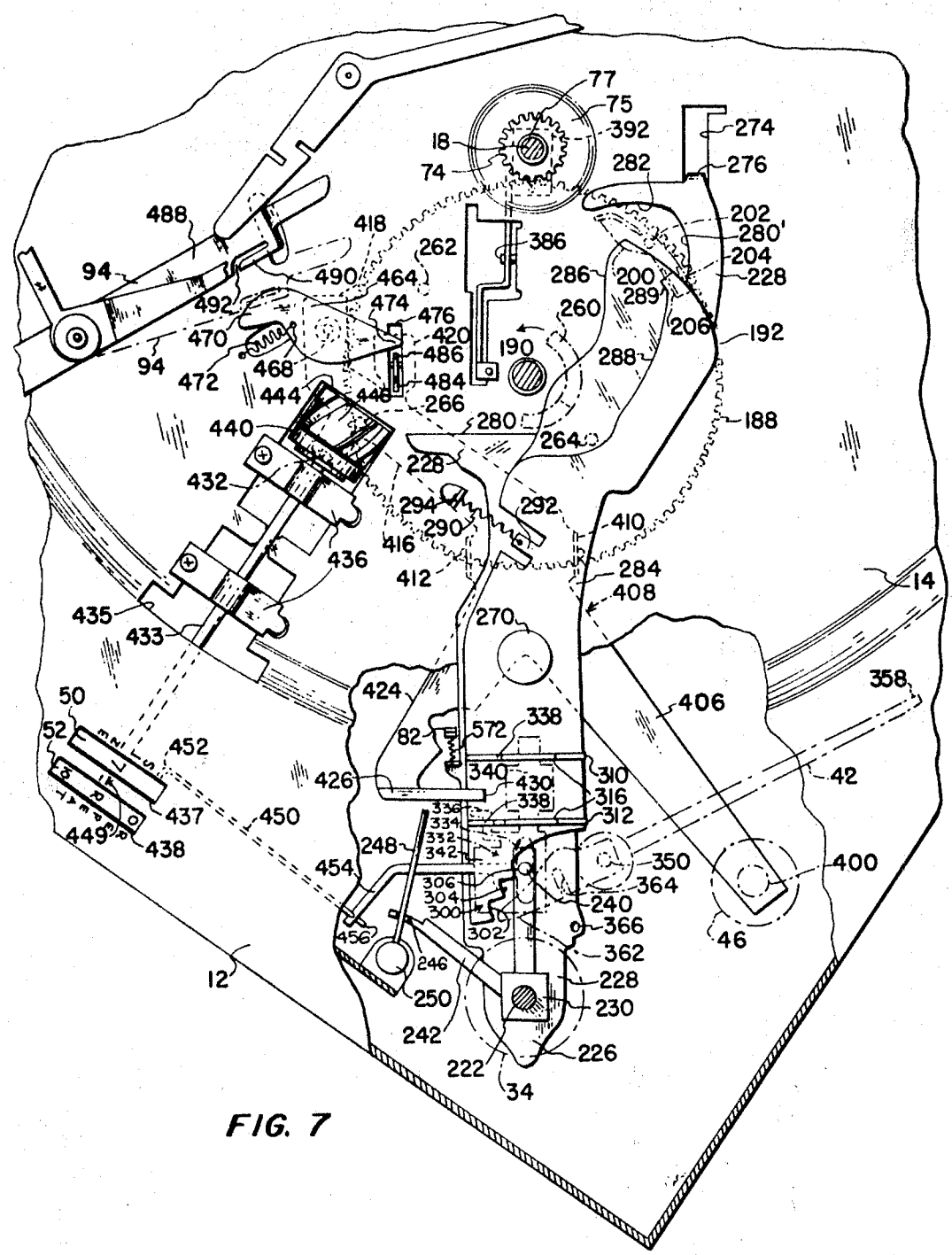
FIG. 7 is a top partial plan view of the manual and automatic control mechanism with parts cut away and some parts shown in phantom.
Figure 8:
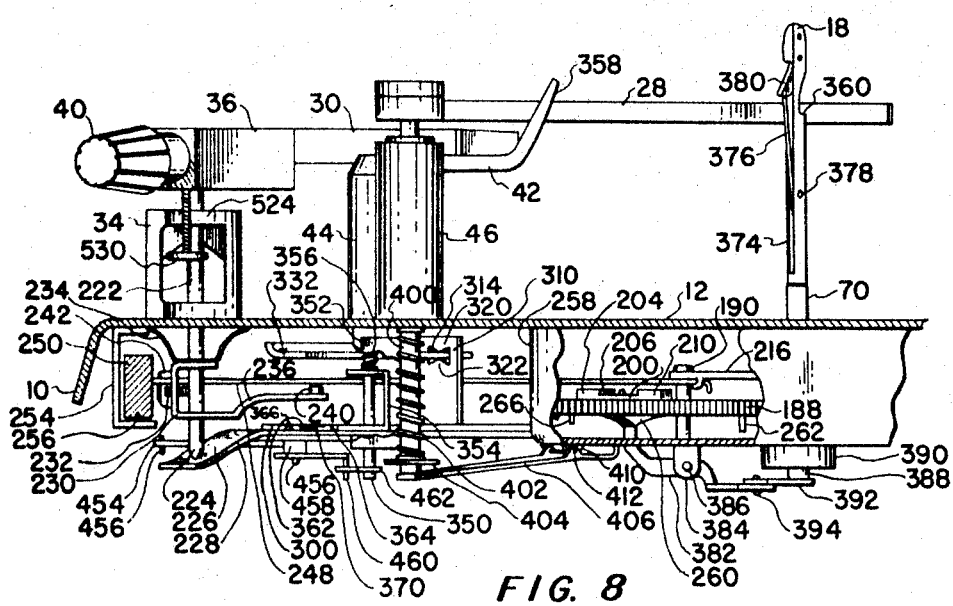
FIG. 8 is a side view in partial section showing the mechanism for pick-up and set-down of the tone arm in accordance with the record size.

Referring to FIG. 3 and also to FIGS. 7 and 8, the tone arm 30, supported through yoke 36, depends from the post 34 on shaft 222, extending through platform 12. The tone arm 30 is affixed to the shaft 222 which is rotatably mounted in post 34 and also slidable longitudinally therein. The extended end of the shaft 222 is rounded, as at 224, and rests upon cam tongue 226 of elongated actuator 228. The tone arm bracket 230 is affixed to the shaft 222 by means of set screw 232 and the assembly is biased downwardly by means of the leaf spring 234 between the top of the tone arm bracket and the bottom of the platform 12. The tone arm bracket 230 has bracket arm 236 with the pin or lug 240 at its extended end and a second arm 242 having a vertical slot 246 in which rod 248 is slidably carried. A weight 250 is attached at the end of rod 248 at a point above the center of gravity. The support 254 is attached to the underside of platform 12 and has protuberance 256 extending upwardly therefrom and engageable with a matching indentation in the bottom of weight 250. The rod 248 extends through opening 258 into the well 14 and has its extended end supported within the slot of tab 220 in the manner described in United States Patent No. 2,963,297.

Recycle gear 188 has a circumferential cam 260 (FIGS. 7 and 8) on its underneath side, downwardly depending pins 262 and 264 and protuberance 266. Pin 262 is slightly longer than pin 264 for a purpose to be described. These pins are spaced substantially diametrically opposite each other and spaced from the center shaft 190 about the same distance. Both pins have their extended ends spaced from the bottom of well 14. Protuberance 266 is located near the outer edge of the recycling gear 188.

The actuator arm 228 extends from beneath tone arm shaft 222 through the opening 258, under the recycle gear 188 where it is supported in sliding relationship by the pin 270 (FIG. 7) passing through a slotted guide (not shown) therein. The pin 270 is attached through the bottom of the well 14 in any suitable manner. The side edges of the actuator arm 228 may be turned down adjacent pin 270 and extend through slots in the bottom of well 14 to provide a guiding surface for the straight-line sliding action of the actuator arm 228. Another slot 274 is shown cut through the bottom of the well 14 adjacent the end of the actuator arm 228 opposite pocket 75. A downwardly bent ear 276 extends from the actuator arm 228 into the slot 274 to act as a similar longitudinal guiding track for the actuator arm.

The end of the actuator arm 228 is bifurcated and formed into an elongated straight cam surface 280 which is curved outwardly from the pin 190, on which the recycle gear rotates, as shown at 280′ and has an inwardly directed cam lobe portion 282. The cams 280, 280′ and 282 are adapted to be engaged by the pin 262 on the recycle gear 188 and in that order.

Located immediately above the actuator arm 228 is the tone arm control lever 284, pivotally mounted on pin 270. The tone arm control lever has an inner lower cam surface 286 and an outer upper cam surface 288, the former adapted to be engaged by the long pin 262 on the recycling gear and the latter adapted to be engaged only by the short pin 264 on the recycling gear. The cam surfaces 286 and 288 are spaced vertically from one another and can be formed from separate pieces riveted together or from one piece bent over upon itself. The cam 288 has a detent 289.

Th tone arm control lever 284 (FIG. 7) is attached to the spring 290 as at ear 292 and the other end of the spring is attached to the upstanding ear 294 depending from the bottom of well 14. The spring 299 biases the tone arm control lever toward the recycling gear and the pins 262 and 264 thereon. The other end of the tone arm control lever extends, immediately adjacent to the actuator arm 228, through opening 258, and has at its end a ratchet 300 with stepped, curved notches 302, 304 and 306, representign stop positions for 7 inch, 10 inch and 12 inch records respectively.

The tone arm control lever 284 carries spaced upright support members 310 and 312 having aligned slots 314 and 316 therethrough with opposed pointed shoulders 320 and 322 therein (see FIG. 8) illustrated in support 310. These supports 310 and 312 carry tone arm latch 332 horizontally therebetween. The tone arm latch 332 is spaced above actuator arm 228 by means of supports 310 and 312 and has a longitudinal slot 334 and an adjustable stop or tab member 336, which is engageable with the top edge of support 312 at recess 338 in the top edge thereof. The trunk of the tone arm latch between the supports 310 and 312 has an upwardly curved ear 340. The bracket arm 236 of tone arm bracket 230 extends under the tone arm latch 332 with its lug 240 at the end thereof engageable with slot 334.

The tone arm latch has a second upwardly curved edge 342, similar to but longer than the ear 340, which is engageable with the lug 240 so that the latch can be raised and slide over and upon the lug 240 to engage same in the slot 334, in a manner to be described.

FIGS. 7 and 8 make it clear that the flag or sensing arm 42 is supported by and affixed to the vertical shaft 350 which extends through the support post 44 and the platform 12 and through the bracket 352, part of which is cut away to show the record size bracket 354 and hold-down spring 356. The flag has a tip end 358 engageable with the edge of a record on the spindle 18 to indicate the size of record about to be played. The flag 42 is biased downwardly by the spring 356 and in its downward position is rotatable in an arc inwardly toward the spindle 18 to contact the tip 358 against the edge of the bottommost record held by notch 360 thereon.

The record size bracket 354 has a lower blocking arm 362 with a transverse slot or cam track 364 extending therein and engageable with the cam track follower 366 affixed to or a part of the tone arm actuator 228. The leading edge of the blocking arm 362 has a bevel along its lower surface as indicated at 370 (FIG. 8). The beveled edge 370 is engageable with the cam track follower 366 and adapted to slide up and over same, against the bias of the spring 356, as the blocking arm 362 is rotated or as the actuator arm 228 is reciprocated. Also the cam track 364 is beveled outwardly along its parallel bottom edges to present matching surfaces with the outer contour of the cam track follower 366. By these means as the actuator arm 228 is reciprocated the cam track follower 366 can move under and raise the blocking arm 362 in any position and come into registry with or out of registry with the cam track 364. The reciprocation of the actuator arm 228 sweeps the cam track follower 366 through the cam track 364 and rotates the signal arm 42 into contact with the edge of a record to be played. As the signal arm 42 is rotated counter-clockwise by this sweeping action, if it strikes an obstruction the blocking arm 362 can ride over the cam track follower 366, disengaging the cam track 364 therefrom. This raises the blocking arm 362 so that the tip end clears the ratchet 300.

When the obstruction of the tip 358 is caused by a 12-inch record on spindle 18, the blocking arm 362 is positioned by this action to register with the notch 306 of the ratchet 300. A 10-inch record causes the blocking arm to register with the notch 304 and in normal or "7-inch" position, the blocking arm registers with the notch 302. The foregoing predetermined positioning of the blocking arm 362 limits the pivotal return of the tone arm actuator 284 which pivots the tone arm 30, through the engagement of the lug 240 on the tone arm bracket 236 in the slot 334, to the record-playing position called for by the signal 42.

FIGS. 7 and 8 illustrate the means by which one record at a time is allowed to drop downwardly on the spindle 18 to the turntable. A longitudinal slot 374 is provided in the spindle. The record release lever 376 is pivotally mounted therein on transverse pin 378 and a guide means 380 is similarly mounted in the tip of the spindle. The tip end of lever 376 extends above the notch 360 a distance less than the thickness of a record. As described in said United States Patent 2,974,962, a record release lever 382 is pivotally mounted under the well 14 by means of the bracket 384 and the pin 386. One end of the record release lever 382 engages the cam 260 on the underside of the recycling gear 188. The cam 260 contacts the lever 382 once during a revolution of the recycling gear and in so doign raises the other end of the lever against the shaft 388 extending from the base 390 of the spindle assembly. By means of an internal cam (not shown) the lever 376 is moved inwardly and the bottom most record is moved so that its central aperture clears the notch 360. The record thus drops into play position.

In the past experience has taught that the weight of a stack of records or an obstruction of the non-adjustable spindle assembly can cause sufficient friction in these parts to distort or bend the spindle 18 under the force of the lever 382. It was found that this malfunction can be eliminated by preventing direct contact of the lever 382 with the shaft 388 and interposing the spring steel extension 392 attached thereto by means of the rivet 394. Any obstruction of the action within the spindle 18 is absorbed by the over-throw action of the spring 392 which allows the lever 382 to be pivoted freely by the cam 260 without damage or bending of the spindle or damage to the motor drive parts.

The record hold-down arm 28 is normally not used during the manual operation of the record changer of this invention and can be raised and turned to a position tangential to the well 14 so that records can be placed on and removed from the spindle 18. When the record hold-down arm 28 is rotated to a point adjacent the spindle over one or more records, the transverse pin within the post 46 is aligned with a longitudinal slot therein and the record hold-down arm and the shaft 400 to which it is attached, are free to drop so that the arm 28 rests on the top record.

The shaft 400 (see FIGS. 7 and 8) extends below the platform 12 and is biased downwardly by means of the coil spring 402 engaged between the split washer 404 and the bottom of the platform 12. The spring 402 holds the record hold-down arm against the records and as the last record drops from the notch 360, the spring moves the end of the shaft 400 into abutment with one arm 406 of the automatic shut-off lever 408. The lever 408 is pivotally mounted beneath the well 14 by means of the bracket 410 and the pin 412 and has one arm 416 with bifurcated tabs 418 and 420 extending therefrom. The automatic shut-off lever 408 is also bifurcated at the other end with L-shaped arm 424 extending upwardly to a shoulder stop member 426 adjacent and engageable with the bottom surface of the platform 12 and having a lateral arm 428 with the cam 430 at the end. The cam 430 is adjacent to the upwardly curved ear 340 on the trunk of the tone arm latch 332. The cam 430 is adapted to engage the curved ear 340 as the tone arm control lever 284 is pivoted on the pin 270 and the automatic shut-off lever is activated. The arm 416 has pointed tab 432 extending upwardly therefrom. The functions of these parts will subsequently be described.

Figure 9:
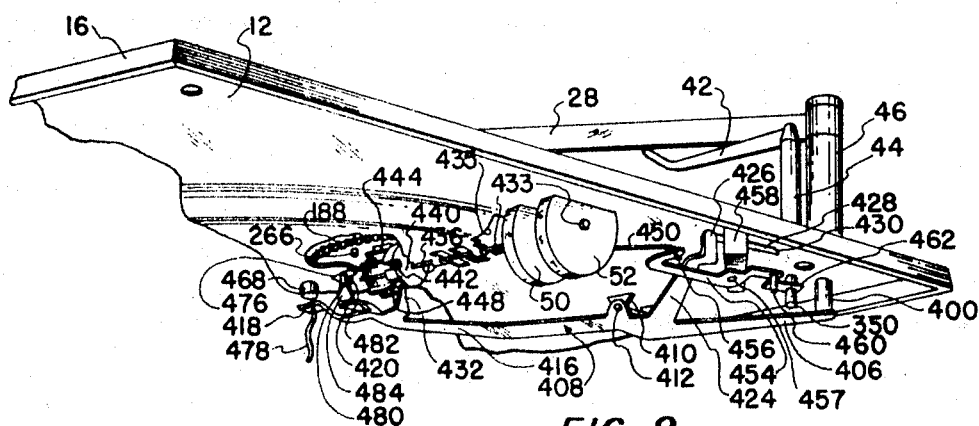
FIG. 9 is a bottom perspective view with certain parts omitted to show the record repeat and size dial, and the automatic shut-off means of this invention.
Figure 10:
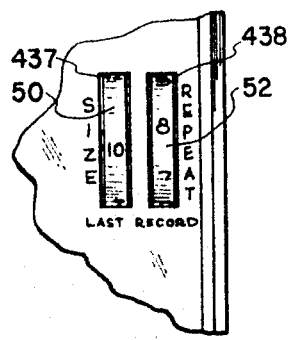
FIG. 10 is a fragmentary top plan view of the dials for size and number of repeat plays for a sole or last record.

In connection with FIG. 1, reference was made to dial indicators 50 and 52 for the size of record and repeat of a record, respectively. In FIGS. 3, 9 and 10 the dials are shown to be mounted on the shaft 433 which extends under the platform 12 through the aperture 435 into the well 14, to a point adjacent the periphery of the recycle gear 188. The shaft 433 is suspended in rotational relationship by a pair of supports 436 and the dials extend their circumferential surfaces through apertures 437 and 438 slightly above the platform 12. Affixed to the end of the shaft 433 is a collar 440 having a transverse notch 442. Adjacent the collar 440 or as part thereof is a spur gear 444, the teeth of which are equally spaced except for the space 446. The space 446 is diametrically opposite to the notch 442. A second notch 448, spaced the equivalent of one revolution of the recycle gear 188 by pin 266 from the notch 442 is provided in the outer surface of the collar 440. The notch 448 is not as deep as the notch 442, as shown. The spur gear 444 is so positioned under and adjacent to the recycle gear 188 that the pin 266, engages same once each revolution, causing partial rotation of the collar 440 and the shaft 433 along the repeat dial 52. The passage of the pin 266 through the space 446 does not rotate the spur gear. This is the neutral or "0" repeat position of the dial 52.

The collar 440 is adjacent the tab 432 on the automatic shut-off lever 408, and is adapted to slide against the tab as the pin 266 rotates the spur gear 440 step by step clockwise, until the tab reaches the notch 442, allowing the full pivotal action of the automatic shut-off lever 408. The adjacent notch 448, when engaged by the tab 432, locks the record player in repeat play and this engagement corresponds to an indicia "R" on the dial 52 (FIG. 7), when set adjacent the score or mark 449 between the dials.

The repeat dial 52 controls the position of the collar 440 and the spur gear 444. These parts can be constructed to produce any desired number of repeat plays of a sole or last record. The spur gear 444 will have one gear tooth, preferably a beveled gear tooth, for each repeat play, and the repeat dial 52 will have a corresponding numeral for each gear tooth. Thus, a repeat dial 52 for a record player designed to play a record from one to ten times successively, will have in sequence on its periphery the indicia: "0," "1," "2," "3," "4," "5," "6," "7," "8," "9," "10" and "R," with the "0" and the "R" adjacent to each other. There will also be ten equally spaced gear teeth on the spur gear 444. When the dial 52 is set at "3" for example, the pin 266 will, on each recycle operation of the recycling gear 188, engage successively on three of the ten gear teeth on the spur gear 444 before the tab 432 comes into registry with the larger notch 442. The "R" or repeat position of the dial 52 is between the last indicia "10" and the "0" repeat position so that the record player puts itself into automatic operation and must be set for repetitious play. When the dial 52 is set at the "0" or "R" positions, then the pin 266 does not engage the spur gear 444, since the space 446 allows the pin 266 to pass therethrough.

The instant record changer is designed to play a number of records of different sizes provided the records are in a standard pyramid stack on the spindle 18, with the larger diameter record or records on the bottom and the smaller diameter records on the top of the stack. The records cannot be intermixed or stacked in a reverse pyramid. The normal record sizes are 7 inches, 10 inches and 12 inches in diameter.

During normal operation the flag 42 does not touch the edge of a 7-inch record and as the cam track follower 366 sweeps through the cam track 364, the flag 42 and the record size bracket 362 are carried to a point where notch 302 automatically stops the tone arm latch 332 and the tone arm 30 at a position to play a 7-inch record. Since the flag does not sense the size of a record placed on the turntable 20 during manual operation or upon the setting of one or more repeat plays of a sole or last record by means of the dial 52, means are provided to control the flag 42 during the repetitive play of a record of any desired size.

This control is provided by the size dial 50, which is rotatably mounted on the shaft 433. The positioning of the size dial and the repeat dial 52 on the same shaft is for convenience only to place the dials in axial adjacency. The size dial 50 can be mounted on a separate shaft located laterally from the shaft 433 for the purpose of providing an axial mounting.

Referring to FIGS. 7 and 9, a push rod 450 is affixed to the peripheral edge of the dial 50 by means of the offset 452 extending into an aperture therethrough to form a pivot point. The other end of the push rod 450 is affixed to the flag control lever 454 by similar means such as the offset 456 extending through an aperture in the end of the lever 454. The flag control lever 454 is pivotally mounted on the pin 457, from the bracket 458 attached to the underside of the platform 12. The other end of the flag control lever 454 carries vertical pin 460 into alignment with the crank or stop 462 affixed to the shaft 350. The rotation of the dial 50 moves the push rod 450 longitudinally and pivots the flag control lever 454 to bring the pin 460 into a position whereby it is contacted by the crank 462 to define desired stop positions for the flag 42.

The size dial 50 bears the size indicia "7", "10" and "12" to correspond with the record sizes. Space is provided for other record sizes such as "8", "9", and "11" for 8-inch, 9-inch and 11-inch records when and if they become commercially available. Smaller size records can also be accommodated. The size dial 50 can be used to play a part of a record as will be described along with its primary function of controlling the position of set down of the tone arm 30 during repetitive play of a record.

As part of this invention means are provided to manually reject a record, delay the automatic rejection of a record prior to or during repeat plays, and to provide for the rejection of a record and the shut-off of the machine by remote of pre-set control. These means (see FIG. 7) include the flat automatic shut-off latch 464 rotatably mounted on the pin 468 against the bottom of the well 14. The automatic shut-off latch has a cam surface 470 at one end adjacent to the starting lever 94 and is resiliently held by means of the spring 472 attached at the cam end to the well 14. The automatic shut-off latch 464 lies against the flat surface of the well 14 with the other end 474 adapted to pass or oscillate over the opening 476 in the well 14. The spring 472 acts to return the latch 464 to the position shown in FIG. 7 once it has been displaced from this position.

The shaft 468 may be affixed to the latch 464 or otherwise attached so that the latch 464 is rotatably mounted thereon and is raised and lowered relative to the well 14, i.e., the shaft 468 and the latch 464 are also movable along the axis of the shaft. The spring 472 serves the additional function of biasing the latch 464 downwardly toward the well 14.

The extended end of the shaft 468 terminates and is normally spaced from the tab 418 of the lever 408. An insulated electrical lead 478 is attached to the tab 418 and to one terminal of the last record indicating light 26, the second terminal of which connects through a source of low voltage current, i.e., a winding of the motor coil 129 and back to ground, that is to the automatic shut-off lever 408. Contact of the tab 418 with the end of shaft 468 thus causes the light 26 to be turned on, and raises the automatic shut-off latch 464 against the spring 472.

Pivotally mounted on the transverse pin 480 supported by the bracket 482 is a delay latch 484 (see FIGS. 7 and 9) having a point 486 extending through the aperture 476 of the well 14 and into the plane of the normal position of the automatic shut-off latch 464 and registerable with the end 474 thereof. The delay latch 484 is mounted on the pin 480 above the center of gravity so that unless tipped to one side or the other the lower end is in registry with the tab 420 of the lever 408. In this position the lever 408 is locked and cannot pivot. The tip end 474 of the automatic shut-off latch 464 is similarly in the plane of the long pin 262 on the recycle gear in either its raised or lowered position. Each rotation of the recycling gear 188 sweeps the long pin 262 across the edge of the end 474 causing same to strike the tip 486 and tilt the delay latch 484 out of contact with the tab 420.

Referring to FIG. 7, it is seen that the starting lever 94 has a raised or stepped portion 488 from which depends longitudinal tab 490 formed by the L-shaped serration 492. The tab 490 is raised sufficiently above the well 14 so as to clear the automatic shut-off latch 464 when the latter is in its lowered position. This is shown by the dotted line position of the lever 94. The operation of the lever 408 brings the tab 418 against the shaft 468 and raises the automatic shut-off latch 464 so that it is in the plane of the tab 490. When this action occurs the pin 262 in striking the end 474 of the lever 464 causes the cam surface 470 to contact and move upon the tab 490 and trip the starting lever 94 and "ON-OFF-REJ" knob 22 to "OFF" position, thus stopping the record player. The horizontal and vertical positioning of the tab 490 is readily accomplished by bending this metal part into exact alignment with the cam surface 470.

Figure 11:
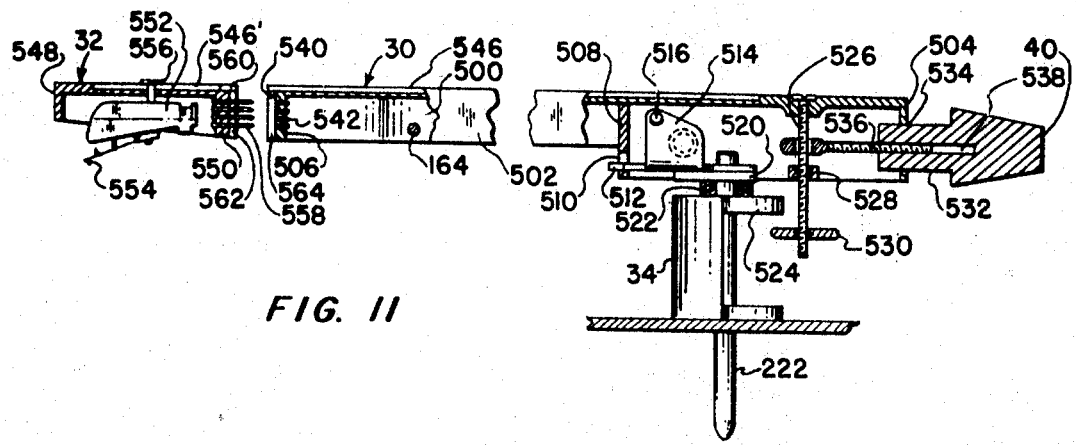
FIG. 11 is a longitudinal cross-sectional view of the tone arm and removable pick-up head.

FIG. 11 shows the details of the improved tone arm assembly provided in accordance with this invention. The tone arm 30 comprises spaced parallel side walls 500 and 502, end walls 504 and 506 and the intermediate wall 508. The space between the side walls 500 and 502 accommodates the hook 162 (FIG. 5) as it engages the transverse pin 164. The intermediate wall 508 has a slot 510 in which extends the base 512 of the yoke member 514 which supports the tone arm 30 so that it can pivot on the pin 516 and rotate with the tone arm shaft 222. The base 512 has a reinforcing plate 520 as a part thereof and both the plate 520 and base 512 are affixed to the end of the shaft 222 which is journaled within the post 34. An inthrust split-race ball bearing 522 rotatably supports the assembly on the post 34.

The post 34 is partially cut away to provide a stop member 524 extending toward and spaced from the threaded bolt 526 carried by the tone arm within the transverse bottom wall segment 528. A knurled nut 530 engages the threaded shank of the bolt 526 and functions as an adjustable stop member to control the downward limit to which the tone arm can pivot on the pin 516 through engagement with the stop member 524. The bolt 526 can be solely supported by the transverse segment 528 or also engage the top wall of the tone arm as shown.

The counter-balance 40 has a shank 532 extending through an opening 534 in the end wall 504 which engages the threaded eye-bolt 536 within the bore 538. The apertured end of the eye bolt encompasses the threaded bolt 526 to provide means of retaining the eye-bolt therein and preventing its rotation as the counter-balance 40 is screwed back and forth during adjustment of the tone arm balance. Other means for joining the bolt 536 within the tone arm can be provided. The bolt 526 need not extend through to the top of the tone arm, but only far enough to engage the eye-bolt 536.

The end wall 506 is off-set within the side walls 500 and 502 to provide a shoulder 540 and carries a plurality of female electrical receptacles 542 to which the electrical leads from the circuitry for signal pick-up, volume-, and tone-control etc. (none of which are shown) are connected. The receptacles may comprise small brass cylinders embedded through the wall 506.

An ornamental metal insert 546 extends along the top of the tone arm 30 and has its counterpart 546' in the top of the pick-up head 32. The head 32 has walls 548 and 550 forming a protective housing for the conventional needle carriage 552 and needle 554. Bolt 556 holds the needle carriage resiliently within this housing. The wall 550 has a plurality of pointed male conductors or probes 558 extending therethrough in matching arrangement with the female receptacles 542. The electrical leads from the male conductors 558 to the needle carriage are omitted.

The metal insert 546' and the end wall 550 are offset as at 560 and 562 to match and receive the shoulder 540 and the extended ends (one of which is shown at 564) of the side walls 500 and 502 in such a manner as to provide lateral and vertical support for the pick-up head 32 when the male and female connectors are pushed together. This arrangement facilitates the removal of the pick-up head and its subsequent attachment to the tone arm 30 without the necessity of disconnecting or connecting any electrical leads.

The combination of the limit stop 512, the tone arm set adjustment knob 38 and the resilient mounting of the needle carriage 552 aid in preventing the needle 554 from being damaged by striking the platform 12, especially during manual operation of the record changer and these parts are known in the art. However, even with these safeguards, both needles and records are from time to time damaged which detracts from the enjoyment of the record player. Part of the difficulty comes from the placement and removal of the needle from a revolving record and the rapid acceleration and deceleration of the turntable during the periods of starting and stopping the record player.

Figure 12:
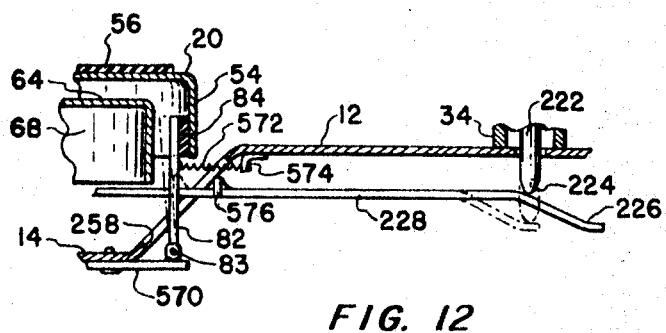
FIG. 12 is a fragmentary cross-sectional side view taken along lines 12—12 of FIG. 7 with certain parts removed to show the automatic turntable brake mechanism.

In accordance with an embodiment of this invention, these difficulties are obviated by further control of the tone arm through the adjustable stop nut 530 and the counter-balance 40 in combination with means whereby the rotation of the record or records is stopped just before lift-off and held until just after set-down of the tone arm. The latter means are referred to briefly in FIG. 7 and are shown in detail in FIG. 12 wherein the associated parts, such as the tone arm latch, the actuator mechanism etc. have been omitted. The brake lever 82 extends through the opening 258 of the well 14 into juxtaposition to flange 54 of the turntable 20. A bracket 570 is attached to the well 14 to provide support for the pin 83 on which the brake lever 82 operates. A spring 572 attaches between the brake lever 82 and the underside of the platform 12, as at bracket 574. The tone arm actuator 228 passes in adjacency to the brake lever and has an upstanding tab or shoe 576 therein extending in line with and adapted to strike the brake lever 82 as it is oscillated. The shoe 576 passes through the opening 258. When the actuator 228 moves to the full line position, the shoe 574 releases the spring-actuated brake lever allowing the resilient brake pad 84 to gradually press against the flange 54 and brings the turntable to a gradual stop, while plate 68 is still rotating through the bearing surfaces 81 (FIG. 2), just before the cam 226 has raised the needle 554 from a record. Next, when the actuator is moved to the dotted line position the tone arm thereby being lowered, the shoe 576 strikes the lever 82 to release the brake against the spring 572 just after the needle engages the grooves of a record. By proper adjustment of the counter-balance 40 and the limit stop 530, all phases of movement of the tone arm are smooth and there is no tendency for the needle to jump or bounce out of the starting groove, be dragged across the face of a record or onto the surface of the platform 12.

MANUAL OPERATION

The record changer of this invention is operated manually as follows:

(a) Manual play with no shut-off and no repeats

The record hold down arm 28 is raised and rotated away from the spindle 18 to its inoperative position. A record is placed on the spindle 18, moved laterally over the notch 360 and lowered or dropped to the turntable. The record hold down arm may be left in its inoperative position. The size dial 52 can be left in any position or moved to the "7" position and the repeat dial 50 can be in any position, since recycle mechanism will not be actuated between records.

The speed control knob 24 is turned to the speed at which the record is to be played and the starting knob 22 is turned to its first position. Disc 96 thereby registers "MAN" in opening 98, the hook 162 disengages from the pin 164, freeing the tone arm and the main switch is turned on. This starts the motor 128 and simultaneously brings the idler wheel 124 into contact with the flange 68, thus rotating the record. As the tone arm is pivoted upwardly the limit of the aperture 510 and rotated manually, the shaft 222 not being raised, the tone arm bracket 230 and the arm 242 thereof are also rotated and the weight 250 remains on the support 254. The lug 240 clears the tone arm latch 332 and the brake lever 82 is in the released position. When the tone arm has been rotated to a point above the outer edge of the record it is merely set down in the beginning grooves and the record plays. Separate means, not shown, are used to control the tone and volume.

When the needle comes to the end of the record it oscillates back and forth in the velocity grooves of the record and stays in that position until lifted off and returned to the post 48. Another record can be placed on the spindle and played in this manner. To stop the record player, the knob 22 is turned to "OFF" position. This locks the tone arm into position on post 48, retracks the idler wheel and stops the motor, viz, reverses the foregoing functions. The record player will operate in this manner with the record hold-down arm in its lowered and operative position adjacent the spindle because the recycle actuator arm 248 remains inoperative and the delay latch 284 prevents automatic cycling, rejection or shut-off of the record player in any event.

(b) Manual operation with repeat play of a single record

A record is placed on the turntable as above explained and the record hold down arm is left in its raised or inoperative position away from the spindle 18. The correct speed of rotation is set by knob 24 and the size of record is set on dial 50 i.e. for a 10″ record. The knob 22 is turned to its second position, "REJ" and released. This starts the motor, engages the idler wheel and the turntable and record rotate. The dial 96 has been turned to register "AUTO" in aperture 98 and when the knob 22 is released it returns to "ON" position but because of the lost motion slot 90, "AUTO" still registers in the aperture 98. The tone arm lock 162 and brake lever 82 are released. Since the knob 22 was turned to "REJ," the ear 110 of the starting lever is moved into contact with the flange 210, pivoting the actuator 200 into the path of the cog 78 to start a recycle operation on the next revolution of the gear 74. The long pin 262 moves against the cam 280 and the actuator 228 is moved toward the shaft 222. The cam tongue 226 thereon lifts the tone arm and tone arm bracket 230. The cam 260 actuates the lever 382 and the spindle 18 to drop a record on the turntable. Instead of placing the record manually on the turntable, same could be placed on the spindle for this type of play.

As the long pin 262 sweeps along the cam 280 it also contacts the cam 286 at the time the tone arm has been raised to its maximum. The arm 242 carries the weight 250 with the rod 248 above and free of the bracket 254. The lever 284 begins to pivot on the pin 270 and carries the latch 332 underneath the cam 430 on the automatic shut-off lever 228 and into a position where it rides upon and engages the slot 334 around the pin 240 of the tone arm limit bracket assembly. The outward movement of the actuator arm 228 engages the cam track follower 366 with the cam track 240 and the signal arm 42 is pivoted toward the edge of the turntable until the crank 462 is stopped by the pin 460 according to the dial 50 which was set for a 10-inch record. The blocking arm 362 and the signal arm 42 are stopped and the cam track follower 366 slips out of the cam track 240, due to the action of the spring 356, leaving the blocking arm in line with the notch 304 of the ratchet 300. Just as the pin 262 nears the end of the cam 286, the short pin 264 is adjacent to the cam 288 and gradually takes over the function of allowing the lever 284 to move back under the action of the spring 290 as the tone arm is swung out over the record. The lever 284 is always under the control of the pins 262 and 264 and the blocking arm 362 so that it cannot be suddenly moved by the bias of the spring 290.

The blocking arm 362 stops the lever 284 and the tone arm at a point over the starting grooves of the 10-inch record. At this time the actuator 228 has reached the limit of it sliding action and the brake lever 82 is brought into contact with the flange 54 to stop the plate 64 and the record momentarily. Then as the pin 262 reaches the cam 282, the actuator is retracted and the cam tongue 226 gradually lowers the tone arm, disengaging the lug 240 from the tone arm limit bracket assembly, and sets the needle on the starting grooves of the record. Just after touch-down of the needle the brake arm 82 is released and the play of the record begins.

The recycle gear 188 continues to be rotated by the gear 74 carrying the long pin 262 into engagement with the automatic shut-off lever 464, the tip 474 of which trips the delay latch 484. Immediately after the delay latch is tripped, the recess 192 registers with the gear 74, the short pin 246 engages the detent 289, to overcome the inertia of the mechanism and prevent accidental recycling, and the recycle gear 188 stops. Since the record hold-down arm 28 is in its inoperative position, the tripping of the delay latch 484 does not influence the automatic shut-off lever 408 and it remains slightly tilted with the stop 426 against the platform 12 and cam 430 above the curved ear 340 of the tone arm latch 332.

The tone arm is thus free to follow the record grooves inwardly toward the spindle 18 and at the same time the arm 242 carries the rod 248 toward the flange 206 on the recycle actuator lever 200. When the needle finishes the play and passes into the lead-in grooves of the record, the rod 248 trips the actuator lever 200 and a recycle operation is begun which repeats the foregoing functions. The record will thus be played continuously until the machine is shut off or changed to another mode of operation.

(c) Manual operation with play of part of a record

The record player and changer of this invention can be used to play part of a record, that is the first inch, or, two and one-half inches of a 12-inch record can be omitted or the first inch and one-half of a 10-inch record can be omitted. This is accomplished by repeating the steps in (b), supra, and setting the size dial 50 at the indicia "10" for a 12-inch record as an example. This positions the pin 460 so that on each sweep of the signal 42 it is stopped by the crank 462 impinging thereon and sets the blocking arm 362 to engage the notch 304 of the ratchet 300. This limits the return of the lever 284 so that the tone arm is set down on the 12-inch record at a radial distance from the shaft 190 for a 10-inch record and the first inch of play is omitted.

As thus far described, attention is brought to the fact that the combination of the clutch action of the washers 81 between the turntable 20 and the plate 64, produces gradual acceleration and deceleration of the record, and the braking action of the lever 82, just before set-down and until after lift-off of the tone arm, prevents the needle from jumping out of a groove or bouncing on the record. These functions also obviate damage to records caused by the fall of a record onto a revolving record on the turntable. The turntable 20 is stationary at the moment of contact of a record to be played on top of a record already on the turntable. It is apparent that additional notches in the ratchet 300, as described herein, not only accommodate different size records but make it possible to omit the play of more finite or even larger beginning portions of a record.

AUTOMATIC OPERATION

The record change of this invention can be operated automatically as follows:

(a) Automatic play of a stack of records with automatic shut-off (no repeats)

A plurality of records is placed on the spindle 18 in pyramidal stack and the record hold-down arm is placed over the records. The size dial 50 is set at "7" or for the smallest record to be played (pin 460 is moved away from the crank 462) and the repeat dial 52 is set at "0." The knob 22 is turned to "REJ" and released which leaves the disc 96 with the inidica "AUTO" exposed in the opening 98. The main switch is tripped, the motor starts and the turntable begins to rotate. As in the previous description the tone arm hook 162 is released and the actuator 200 has been pivoted. One revolution thereafter of the turntable the recycling gear 188 engages the gear 74 and the recycle operation begins.

The tone arm is raised by the cam tongue 226 and the latch 332 engages the tone arm bracket ready to swing the tone arm into the position called for by the signal 42. In this instance with the dial 50 set at "7" the tip 358 engages only the next larger or bottom record, just before the cam 260 pivots the record release lever 382 and the brake arm 82 stops the turntable 20 momentarily. The bottom record drops onto the stationary turntable, and the tone arm is swung into position for play as controlled by the lever 284. The actuator 228 is retracted by the pin 262 and just after set-down of the needle the brake lever 82 is released. The play of the first record begins. These operations continue with the rod 248 initiating rejection and recycle for the play of the next record in sequence until the last record drops onto the turntable. If desired any record being played can be manually rejected at any time by turning the knob 22 to "REJ" position and releasing it. The knob 22 can be turned off at any time during the play or recycling of a record without damage to the record changer. Or, in addition a record can be rejected by remote control through a separate circuit including a 3-volt winding from the motor coil connected to an extension cord and a make-break switch (these parts not being shown) to actuate the solenoid 109.

The record hold-down arm gradually lowers under the bias of the spring 402 as the records are played, and, as the last record falls onto the topmost record on the turntable, the end of the shaft 400 impinges upon the arm 406 of the automatic shut-off lever 408. The delay latch 484 engages the tab 420 of the arm 416 thereof and prevents the lever 408 from pivoting further under the bias of the spring 402. However, the tab 418 has moved against the pin 468 and completed the circuit through the lead 478 to the light 26 which is lighted as a warning that the last record is being played.

The recycle gear 188 is in detent position, that is, with the pin 264 against the detent 289 and the recess 192 opposite the gear 74 during play. As the last record is completed and the tone arm moves into the velocity grooves of the last record, the rod 248 again trips the actuator 200 and the recycling gear is again turned by the gear 74. On this last cycle the automatic shut-off lever 408 is actuated and biased upwardly toward the automatic shut-off latch 464 by the spring 402. Accordingly, as the long pin 262 strikes the automatic shut-off latch 464 and the point 474 trips the delay latch 484, the lever 408 moves upwardly and holds the delay latch aside. This raises the automatic shut-off lever 464 and cam 470 thereof into alignment with the tab 490 of the starting lever 94. At the same time, the arm 428 and cam 430 at the other end of the lever 408 are lowered so that as the lever 284 swings the tone arm back to its position over the post 48, the ear 340 rides upon the cam 430. This releases the tone arm upon the post 48 and prevents the slot 334 from engaging the lug 240 of the tone arm lever 236 as the lever 284 continues to pivot back to detent position. Just before the recycle gear 188 arrives at detent position, the long pin 262 strikes the automatic shut-off latch 464 in its raised position, with the delay latch held aside by the ear 420, and brushes the curved end 470 against the tab 490 of the starting lever 94 to shut off the record changer. The record changer stops in detent position.

(b) Automatic play of a stack of records with repeat play of the last record

It will be observed that during the rotation of the recycle gear, the protuberance 266, depending on the position of the repeat dial 52, either passes through the recess 446 of the bevel gear 444 (at "0" or "R" positions of the dial 52), or engages the teeth thereof one at a time and once for each revolution. If the dial 52 is set at "R" or Repeat position, the collar 440 is turned so that the small notch 448 is in a position of registry with the tab 432 allowing repetitious play of the sole or last record. This permanently restrains the automatic shut-off lever 408 from operating to allow continuous replay of the same record, as previously described.

By setting the dial 52 at the "0" (no repeat) position the collar 440 is turned so that the large notch 442 is in a position of registry with the tab 432 and the lever 408 can operate to shut off the record changer on the next cycle. In order to play a stack of records automatically and also play the last record a desired number of times, the dial 52 is set at any of the positions "1" through "10" corresponding to the number of repeat plays. A dial setting of "10" causes the protuberance 266 to contact each tooth of the gear 444 once during the recycle operation while the collar 440 holds the automatic shut-off lever inactive through its sliding action on the tab 432, until the protuberance passes by gear tooth No. 1 and brings the large notch 442 into adjacency with the tab 432 in the next to last recycle of the record changer. During this time the delay latch takes over and prevents the rejection of the last record until it is played and finally upon being tripped by the pin 262, allows the automatic shut-off lever to stop the record player automatically.

While the invention has been shown and described in connection with the illustrated embodiment, it is to be understood that variations and modifications of the form and details of the illustrated device and its parts may be made without departing from the spirit of the invention and the only limitations attaching thereto appear in the appended claims.

What is claimed is:

1. A record player and changer having a platform, a starting switch associated with starting means connected to a motor drive having a drive connection with a turntable rotatably mounted from said platform and adapted to support record tablets in playing position relative to a tone arm adapted to be moved from a retracted position to a playing position on a record tablet, a record hold down arm biased to be engageable with said records, a signal arm adapted to sense the size of a record to be played and a recycling mechanism including a recycling means for automatically and manually playing record tablets sequentially and return said tone arm to said retracted position between plays, the combination of
    (a) shut-off means engageable with said record hold down arm for movement thereby into a biased position as the last record tablet is dropped by said spindle to said turntable to inactivate said starting means,
    (b) a delay means adapted to immobilize said shut off means against the bias of said hold arm,
    (c) means to selectively disengage said delay means as the last recycle operation near completion and before the return of said tone arm to playing position whereby said starting means is inactivated as said tone arm is in said retracted position,
    (d) and a second delay means engageable with said shut-off means to immobilize same against the bias of said hold down arm during repeated cycles of said recycling mechanism whereby a single record is played repetitiously.

2. A record player and changer in accordance with claim 1 in which said second delay means is actuated by said recycle mechanism for a predetermined number of said repeated cycles.

3. A record player and changer in accordance with claim 2 in which said second delay means comprises a rotatable gear member and a rotatable collar member, each having a peripheral recess diametrically opposite the other, said recycle gear has a protuberance adapted to engage and partially rotate said gear and collar member each revolution, said collar being adapted to engage said shut-off means to immobilize same against the bias of said hold down arm, said gear member recess disengaging said protuberance from said rotational engagement with said gear member to register said collar recess with said shut-off means and thereby release same to the bias of said hold down arm.

4. A record player and changer in accordance with claim 3 in which said collar has a second recess diametrically opposed to said gear recess and adapted to retain said shut-off means against the bias of said hold down arm while said gear member is immobilized and thereby provide continuous repeat play of a record.

5. A record player and changer in accordance with claim 1 in which said tone arm is engaged by a tone arm latch during each recycle operation for movement to and from said retracted position and said disengaging means comprises a cam adapted to lift said tone arm latch during the last cycle in which said delay means is inactivated.

6. A record player and changer in accordance with claim 1 wherein said drive motor includes a rotor and a stator, said rotor has a central axial recess, a drive shaft extending centrally through said rotor and said axial recess and through an aperture aligned therewith in said platform, a stationary flanged bushing rotatably supports said drive shaft along its extended length, through said aperture and is affixed by means of said flange to said platform, and a thrust bearing is provided at the other end of said drive shaft.

7. A record player and changer in accordance with claim 1 including
    a recycling gear as part of said recycling mechanism,
    a protuberance on the periphery of said recycling gear,
    a bevel gear rotatably mounted and affixed to a control shaft supported by said platform,
    a recess in said bevel gear,
    a collar adjacent said bevel gear affixed to said control shaft,
    adjacent large and small recesses in the periphery of said collar at a point diametrically opposite the recess on said bevel gear,
    said protuberance on said recycling gear adapted to engage a tooth of said bevel gear to partially rotate same on each recycle operation, said recesses in said collar being engageable with a tongued tab on said automatic shut-off lever,
    whereby engagement of said tongued tab with said small recess inactivates said automatic shut-off lever to allow continuous repeat play of a sole or last record on said record-holding plate and engagement of said tongued tab with said large recess allows said automatic shut-off lever to pivot under the bias of said record-hold shaft and automatically shut-off the record player.

8. A record player and changer in accordance with claim 7 which includes
    means for rotating said shaft and bevel gear for engagement of said protuberance with a predetermined number of said gear teeth before release of said automatic shut-off lever by said larger recess in order to play a sole or last record a predetermined number of times, said means having numerical indicia corresponding to the number of such repeat plays.

9. A record player in accordance with claim 1 in which said turntable comprises a circular plate rotatably mounted on a spindle
    a plurality of radially spaced bearing protuberances extending from and affixed to said plate in a common plane,
    a record holding plate resting in rotational relationship on said bearing protuberances and having a central aperture therein,
    a retaining ring affixed centrally to said circular plate, said ring having an outer circumferential flange overlapping and spaced from the inner edge of said central aperture within said record holding plate, whereby said record holding plate is held frictionally by said bearing protuberances to rotate with said circular plate while supporting a record thereon and held axially by said retaining ring.

10. A record player in accordance with claim 1 which includes a tone arm post affixed to and extending from said platform, a shaft rotatably supported within said post and extending above said platform, a yoke affixed to the extended upper end of said shaft, a tone arm rotatably supported by said yoke with an extended end over said turntable, an outwardly depending shoulder on said tone arm post and spaced above said platform, a rod extending transversely through said tone arm and spaced between the other end thereof and said yoke, said rod having a threaded portion adjacent said shoulder, a traveling nut on said threaded portion of said rod and adapted to engage said shoulder and adjustably limit the rotation of said tone arm on said yoke, a second threaded rod extending longitudinally into the ends of said tone arm and provided with an eye encompassing said first rod, and counter-balancing weight means engaging said second rod, said weight means being fixedly positionable at desired distances from said point of rotatable support of said tone arm by said yoke.

11. A record player and changer in accordance with claim 1 which includes a record size signal arm engageable with the edge of a record to be released by said spindle a blocking arm rotated by said signal arm and provided with a cam track means biasing said blocking arm and cam track against said tone arm actuator and a cam track follower on said one arm actuator whereby reciprocation of said tone arm actuator during a record change cycle moves said record size signal arm into said engagement with said record.

12. A record player and changer in accordance with claim 11 which includes a manually operated stop member engageable with said record size signal arm.

References Cited

UNITED STATES PATENTS

| | | |
|---|---|---|
| 2,180,859 | 11/1939 | Borchers. |
| 2,564,455 | 8/1951 | Stolberg _____ 274—10 |
| 2,631,857 | 3/1953 | Bauer _____ 274—36 |
| 2,935,324 | 5/1960 | Vistain. |
| 2,944,824 | 7/1960 | Wennerbo et al. _____ 274—1 |
| 2,969,239 | 1/1961 | Loose _____ 274—10 |
| 3,218,078 | 11/1965 | Freier _____ 274—10 |
| 3,254,896 | 6/1966 | Dennis _____ 274—10 |
| 3,271,035 | 9/1966 | Johnston _____ 274—15 X |
| 3,279,798 | 10/1966 | Freathy et al. _____ 274—10 |

FOREIGN PATENTS 464,353    4/1950    Canada.

HARRY N. HAROIAN, Primary Examiner